No. 861,758. PATENTED JULY 30, 1907.
J. F. McCANNA.
CARBURETER.
APPLICATION FILED APR. 8, 1905.
2 SHEETS—SHEET 1.
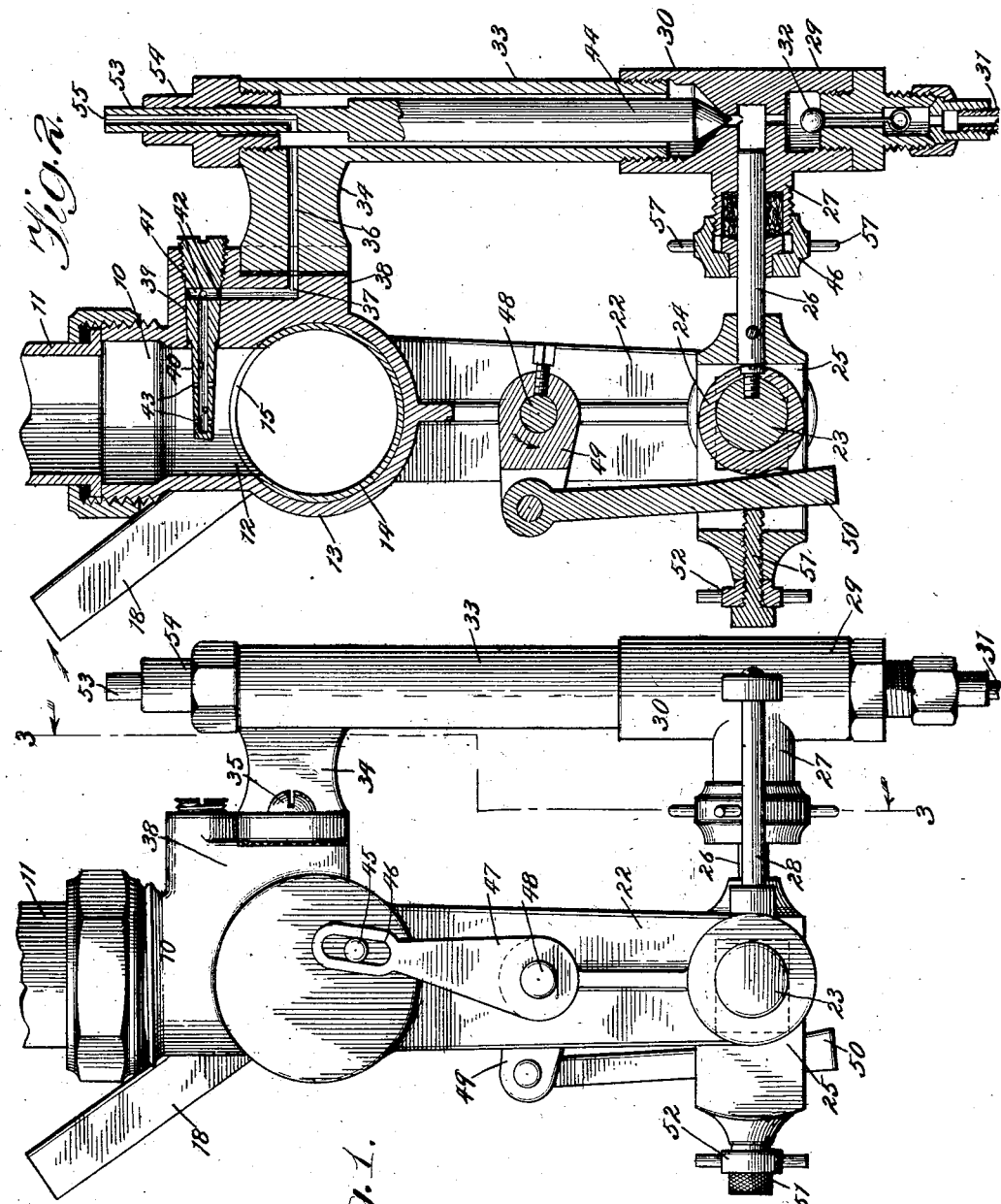

No. 861,758. PATENTED JULY 30, 1907.
J. F. McCANNA.
CARBURETER.
APPLICATION FILED APR. 8, 1905.
2 SHEETS—SHEET 2.
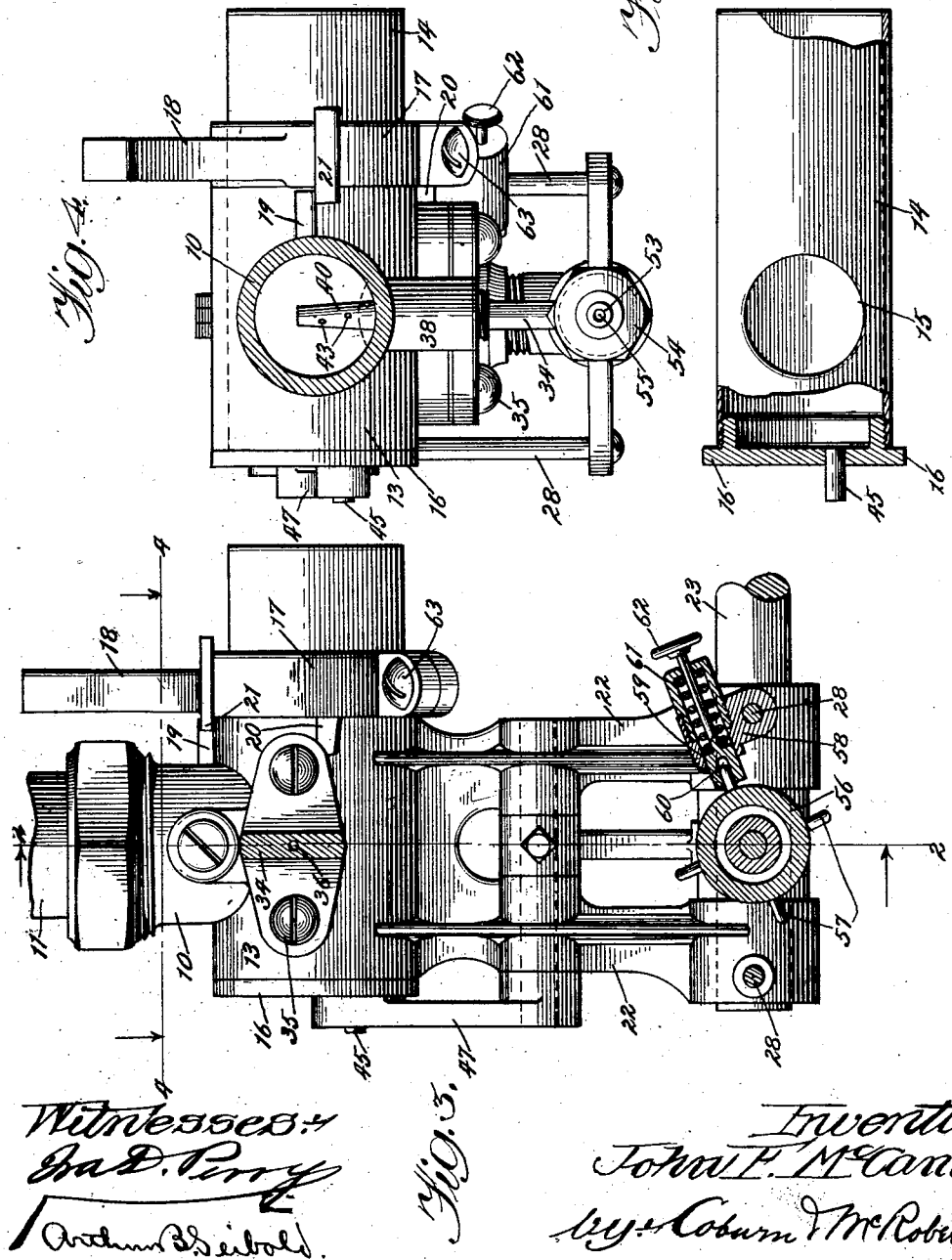

UNITED STATES PATENT OFFICE.

JOHN F. McCANNA, OF CHICAGO, ILLINOIS.

CARBURETER.

No. 861,758.  Specification of Letters Patent.  Patented July 30, 1907.

Application filed April 8, 1905. Serial No. 254,457.

*To all whom it may concern:*

Be it known that I, JOHN F. MCCANNA, a citizen of the United States, residing at Chicago, in the county of Cook and State of Illinois, have invented certain new and useful Improvements in Carbureters, of which the following is a specification, reference being had therein to the accompanying drawing.

This invention relates to that class of carbureters which are designed to be employed with internal combustion engines, such as explosive engines.

The invention contemplates the provision of a suitable mixing chamber having an air inlet, and a pump for forcing into such mixing chamber a definite quantity of the explosive fluid which is there mixed with the air and then sucked into the cylinder of the engine.

The invention also contemplates a valve controlled air supply, and a pump to supply the explosive fluid and which is regulated by a connection with the valve so that the quantity of fluid delivered is proportioned to the quantity of air admitted by the valve.

The invention further contemplates, in a device of the character referred to, a mixing chamber having a main air supply and a fluid connection into which air is admitted to mingle with the fluid before entering the mixing chamber.

Other objects of the invention will be apparent from the accompanying description.

The invention consists of the combinations and arrangements of parts hereinafter particularly described and then pointed out in the appended claims.

In the accompanying drawings:—Figure 1 is a side elevation of the carbureter; Fig. 2 is a vertical section on the line 2—2 of Fig. 3; Fig. 3 is a transverse section on the line 3—3 of Fig. 1; Fig. 4 is a section on the line 4—4 of Fig. 3; and Fig. 5 is a detail of the throttle or air valve.

Referring to the drawings, 10 indicates a mixing chamber which may be of any suitable shape and construction and to which is connected a pipe 11 which forms a continuation of the mixing chamber and is designed to lead to the inlet of the engine with which the carbureter is associated. The chamber 10 is provided with an inlet 12 which opens from a valve casing 13 in which is located a suitable throttle valve 14. In the present instance the valve casing 13 is cylindrical in cross section and is located under the mixing chamber, and the valve 14 is also cylindrical and seated in the casing so as to oscillate therein. The valve 14 is provided with an outlet port 15 substantially of the dimension of the inlet of the mixing chamber 10 and is shown as extending at one end beyond the casing 13, Figs. 3 and 4, such end being open to the atmosphere while the other end is closed, as clearly shown in Fig. 5. The valve 14 is maintained in the casing by means of a shoulder 16 at its closed end which abuts against one end of the casing and an adjustable sleeve 17 engaging the opposite end of the casing and suitably secured about the valve. The sleeve 17 is provided with a lever 18 by means of which the valve may be oscillated. The movement of the lever 18 to open and close the valve is limited by stops 19 and 20 on the casing 13 and adapted to be engaged by a lug 21 on such lever. When the lug 21 is in engagement with the stop 19 the port 15 of the valve is in register with the inlet of the mixing chamber and when in engagement with the lug 20 it is in such position as to nearly close the said inlet, leaving a small opening, as shown in dotted lines in Fig. 4. A pair of legs 22 extend downwardly from the valve casing 13 and suitably journaled thereon is a shaft 23 having fixed thereto between the legs an eccentric 24. Motion may be communicated to the shaft 23 in any suitable manner as through the medium of a connection (not shown) with an operating part of the engine. A yoke 25 is located between the legs 22 and is provided with opposite slots, shown in dotted lines in Figs. 1 and 2, in its sides through which the shaft 23 passes and which permit the yoke to slide transversely to such shaft when reciprocated. The eccentric 24 is located in the yoke 25 and coöperates therewith to reciprocate the same. The yoke 25 has fixed thereto the plunger 26 of a pump 27 designed to force to the mixing chamber, as hereinafter described, the explosive fluid, such as gasolene. The body of the pump is suitably supported and steadied by means of rods 28 suitably connected thereto and to the legs 22. In the present instance the pump body is shown as provided with opposite extensions 29 and 30 the former leading to the inlet of the pump while the latter leads from the outlet thereof. A tube 31 leads from a suitable source of fluid supply and is suitably connected to the extension 29, the inlet of the pump being controlled by a suitable valve, such as a gravity valve 32. A suitable connection leads from the outlet of the pump to the mixing chamber 10 and consists, in the present instance of a vertical tube 33 screwing into the outlet extension 30 and having at its upper end a lateral bracket 34 secured to the casing 13, as by screws 35.

The bracket 34 is provided with a passage 36 communicating with the interior of the tube 33 and a passage 37 in an enlargement 38 of the valve casing. The enlargement 38 is provided at a suitable point with an opening 39 in which is seated a nozzle 40 consisting in the present instance of a tapering tube closed at its ends and screwing into the opening 39 so as to project into the mixing chamber 10. This nozzle 40 is provided with an annular groove 41, Fig. 2, opposite the end of the passage 37 and in which are located apertures 42 opening into the passage of the nozzle, the latter within the mixing chamber being provided with minute radially disposed discharge orifices 43. The outlet of the pump 27 is controlled by a suitable valve, such as the gravity valve 44.

The eccentric is set so as to move the pump plunger on its discharge stroke coincidently with the opening of the inlet valve of the engine, that is upon the suction stroke of the latter. From the foregoing it is obvious that when the eccentric 24 is rotated the plunger 26 will be reciprocated, thus drawing in a charge of explosive fluid past the valve 32 and then discharging the same into the tube 33 past the valve 44 which is lifted from its seat. At each discharging stroke of the pump a definite quantity of the explosive fluid is forced through the nozzle 40 into the mixing chamber 10 where it is thoroughly mixed with and atomized by the air which is sucked into the cylinder by the suction stroke of the engine.

In order to regulate the supply of explosive fluid so as to be in proportion to the quantity of air admitted by the valve 14, I provide a connection between the valve so that as the said valve is moved to throttle the engine the stroke of the pump will be varied accordingly. To this end, in the present embodiment of the invention, the closed end of the valve 14 is provided with a crank pin 45 which takes into a slot 46 in a crank arm 47 fixed to a rock shaft 48 suitably journaled on the legs 22. The shaft 48 also has fixed thereto, between the legs 22, an arm 49 to the free end of which is pivoted a wedge block 50 which is located between the eccentric 24 and one end of the yoke 25. This wedge block 50 provides an adjustable abutment with which and the opposite end of the yoke 25 the eccentric 24 coöperates to reciprocate the yoke, and as it is pivoted to the arm 49 it swings back and forth or reciprocates with the pump plunger. When the parts are in the position shown in Fig. 2 the eccentric engages both the wedge block 50 and the opposite end of the yoke so that all lost motion is eliminated. When the lever 18 is swung in the direction of the arrow, Fig. 2, to throttle the engine, by more or less restricting the inlet 12, the rock shaft 48, through the connections described, will be turned in the direction of the arrow in said figure lowering the wedge block 50 so as to provide lost motion between the eccentric and the wedge block and yoke. When the lever 18 is thrown to the limit of its movement, moving the valve 14 to the dotted lines position of Fig. 4, the wedge block will be lowered to such a degree that only a slight movement is imparted to the pump plunger. When the valve 14 is at the limit of its movement for throttling the engine, that is when the lever is arrested by the stop 20, the stroke of the pump plunger is such as to deliver only sufficient fluid to run the engine at its slowest speed. It will be seen from this that the position of the throttle valve determines the quantity of explosive fluid delivered by the pump, and that any adjustment of the throttle valve 14 instantly varies the stroke of the pump correspondingly so that the proper proportions of explosive fluid and air enter the mixing chamber.

An adjustable abutment, consisting of a screw stem 51, passes through the end of the yoke 25 and the wedge block 50 reacts against this stem which is adapted to be held in adjusted position by a set nut 52. The object of this adjustable stem 51 is to define the throw of the pump in accordance with the maximum capacity of the engine, while the wedge block 50 is designed to vary the throw of the pump from such maximum to the minimum capacity of the engine, depending upon the position of the throttle valve 14. The maximum capacity of the engine having been determined the stem 51 is adjusted to proper position and remains in such position.

In connection with the device described I preferably employ suitable means for partially atomizing the explosive fluid before it enters the mixing chamber 10. For this purpose the valve 44 is provided in the present instance with a reduced stem 53 at its upper end which passes through and is guided by a cap 54 screwing into the top of the tube 33, such stem having a port or passage 55 opening to the atmosphere and communicating with the interior of the tube 33, as shown in Fig. 2. As the pump 27 forces a charge of fluid to the nozzle 40, the vacuum created by the suction stroke of the engine, sucks in air through the port 55 which entering the tube 33 partially atomizes the fluid as it passes therewith to the nozzle 40, this mixture being finally atomized in a thorough manner and to the necessary degree by the air entering the mixing chamber past the valve 14. This preliminary atomizing of the fluid together with its final atomizing in the mixing chamber insures an explosive charge of very high combustibility such as is required to produce the best results in the operation of the engine.

Inasmuch as the tank containing the explosive fluid is usually located above the carbureter, I make the valve 44 of sufficient weight to prevent the head of fluid from forcing the fluid past such valve on the suction stroke of the pump 27. By reason of the port 55 any tendency of the engine on the suction stroke thereof to suck oil past the pump 27 is obviated, as the port 55 then acts as a relief port. As the pump is designed to discharge during the suction stroke of the engine, it is only necessary to have the eccentric set at such position and driven at such speed as to be timed in its movement with the opening of the inlet valve of the engine. Where the carbureter is employed with a compound engine or a plurality of engines which perform their suction strokes in succession, the eccentric 24 is driven at such speed as to deliver a charge of explosive fluid to the mixing chamber in time for the suction stroke of each engine, it being obvious that the tube 11 may lead to one or any number of engines.

With the invention described the supply of explosive fluid delivered by the carbureter is entirely independent of the force of the suction of the engine, and is governed entirely by the pump which discharges at each reciprocation a predetermined quantity of such fluid to the mixing chamber. Moreover, the proper proportions of air and fluid are controlled entirely by the position of the throttle valve.

The pump plunger is provided with a suitable packing box the gland 56 of which is provided with radial pins 57. A carrier 58 is pivoted on one of the rods 28, as shown in Fig. 3, and is provided with a socket in which is located a plunger 59 having a cavity 60. A spring 61 seated in the socket of the carrier presses the plunger towards the gland 56, and the plunger has a button 62. The cavity is designed to engage one of the pins 57 to hold the gland against movement. To disengage the plunger when it is desired to adjust the gland, the plunger is pulled outwardly against the resistance of the spring and the carrier turned on its pivot so as to be out of the way of the pins when the gland is screwed up. The carrier is also adapted to slide along the rod 28 so that the cavity 60 will be in line with the pins in the adjusted position of the gland.

The sleeve 17 is split and is adjustably secured about the valve 14 by a screw 63. By adjusting the sleeve angularly the point at which the valve 14 may be arrested by the stop 20 may be varied. The purpose of this adjustment is to enable the operator to adjust the said valve so that when arrested by the stop 20 it will supply the proper amount of air in running the engine at its lowest speed. This may be readily determined by unloosening the sleeve 17 and turning the valve to ascertain what opening of the valve is necessary, and then fastening the sleeve by the screw 63 so that the lug 21 will be in engagement with the stop 20. Thereafter the valve will always be arrested at that point.

Having described my invention what I claim is—

1. In a carbureter, the combination with a mixing chamber having an air inlet, and a throttle valve controlling the inlet, of a pump, a sprayer connected to the pump and discharging into the mixing chamber in the path of the air, and a connection between the valve and the pump whereby the supply of air and fluid may be regulated by movement of the valve.

2. In a carbureter, the combination with a mixing chamber having an air inlet, and a valve controlling the inlet, of a pump, a spraying nozzle projecting into the mixing chamber in the path of the air, and a connection between the valve and the pump whereby the supply of fluid is proportioned to the supply of air admitted to the chamber by the valve.

3. In a carbureter, the combination with a mixing chamber having an air inlet, and a valve controlling the inlet, of a pump for forcing fluid to the mixing chamber, driving means for reciprocating the pump plunger positively in both directions, and a connection between the valve and the pump, including an adjustable member movable with the pump plunger for varying the throw of the pump.

4. In a carbureter, the combination with a mixing chamber having an air inlet, and a valve controlling the inlet, of a reciprocating pump for forcing fluid to the mixing chamber, driving means for reciprocating the pump plunger positively in both directions, an adjustable abutment movable with and for varying the stroke of the pump plunger, and a connection between the valve and the abutment.

5. In a carbureter, the combination with a mixing chamber having an air inlet, a valve controlling such inlet, and a sprayer discharging into the mixing chamber, of a pump for forcing fluid to the sprayer, driving means for reciprocating the pump plunger positively in both directions and a connection between the valve and the said pump to regulate the quantity of fluid in accordance with the air supply, such connection including an adjustable abutment movable with the pump plunger.

6. In a carbureter, the combination with a mixing chamber having an air inlet, a rotary valve controlling the air inlet, of a reciprocating pump for forcing fluid to the mixing chamber, a yoke fixed to the pump plunger, an eccentric coöperating with the yoke to reciprocate the same in both directions, a wedge block between the yoke and eccentric for varying the stroke of the pump plunger, and a connection between the valve and the wedge for adjusting the latter as the valve is operated.

7. In a carbureter, the combination with a mixing chamber having an air inlet, a rotary valve governing the air inlet, a sprayer discharging into the mixing chamber, a reciprocating pump having a connection leading to the sprayer, a yoke connected to the pump plunger, an eccentric coöperating with the yoke to reciprocate the same positively in both directions, and an adjustable wedge block between the yoke and eccentric, a rock shaft, a crank fixed to the rock shaft and actuated by the valve, and an arm fixed to the shaft to which the wedge block is pivoted.

8. In a carbureter, the combination with an air supply and a valve for controlling the same, of a pump, a yoke connected to the pump plunger, an eccentric within the yoke, a wedge located between the eccentric and one end of the yoke, and a rock shaft having a pair of crank arms one of which is connected to the valve and the other of which is pivoted to the wedge, whereby the pump and the valve may be regulated simultaneously.

9. In a carbureter, the combination with a mixing chamber having an air inlet, and a valve controlling the inlet, of a pump for supplying fluid to the mixing chamber, means for operating the pump, means for defining the maximum delivery of the pump, and means automatically actuated upon the movement of the valve for varying the delivery within such maximum and comprising a pair of connected crank arms one of which is connected to the valve and the other of which is provided with a pivoted arm coöperating with the pump operating means.

10. In a carbureter, the combination with a mixing chamber having an air inlet, and a valve controlling the inlet, of a pump for supplying fluid to the mixing chamber, a yoke fixed to the pump plunger, an eccentric within the yoke for reciprocating the same, means for regulating the maximum delivery of the pump, and means actuated upon the movement of the valve for automatically varying the delivery within such maximum and consisting of a pivoted sliding wedge located between the eccentric and one end of the yoke.

11. In a carbureter, the combination with a mixing chamber having an air inlet, and a valve controlling the inlet, of a pump for supplying fluid to the mixing chamber, a yoke to which the pump plunger is connected, an eccentric for reciprocating the yoke, an additional adjustment carried by the yoke for defining the maximum throw of the pump, and a second abutment located between the eccentric and the first mentioned abutment and adapted to be adjusted by the movement of the valve to vary the throw of the pump within such maximum.

12. In a carbureter, the combination with a mixing chamber having an air inlet, and a valve controlling the inlet, of a reciprocating pump for supplying fluid to the mixing chamber, a yoke connected to the pump plunger, an eccentric in the yoke, an adjustable abutment passing through one end of the yoke, a wedge block located between the abutment and the eccentric, a rock shaft having an arm to which the wedge block is pivoted, and a crank fixed to the shaft and oscillated by the valve.

13. In a carbureter, the combination with a mixing chamber having an air supply, of a reciprocating pump, a connection between the pump and the chamber, and a valve in the connection provided with means to admit air to such connection.

14. In a carbureter, the combination with a mixing chamber having an air supply, of a reciprocating pump, a connection between the pump and the chamber, and a valve in the connection provided with an air port opening into the connection.

15. In a carbureter, the combination with a mixing chamber having an air supply, of a nozzle discharging into the mixing chamber, a fluid supply connection leading to the nozzle, and a valve in such connection having an air port to admit air to the fluid passing to the nozzle.

16. In a carbureter, the combination with a mixing chamber, of a tubular nozzle having radially disposed orifices discharging into the mixing chamber, and a fluid supply connection leading to the nozzle and having an air port leading thereinto.

17. In a carbureter, the combination with a mixing chamber having an air inlet, of a nozzle discharging into the mixing chamber, a pump, a connection between the pump and the nozzle and having an air port leading thereinto, and automatic valves controlling the inlet and the outlet of the pump.

18. In a carbureter, the combination with a mixing chamber having an air inlet, of a nozzle discharging into the mixing chamber, a reciprocating pump, a connection between the pump and the atomizer and having an air port, and a weighted valve controlling the outlet of the pump at a point between the latter and the air port.

19. In a carbureter, the combination with a mixing chamber having a valve controlled air inlet, of a tubular nozzle having orifices discharging into the mixing chamber, a reciprocating pump, a vertical tube connected with the outlet of the pump and with which the nozzle is in communication, and a weighted valve in the tube controlling the outlet of the pump and provided with an air port opening into the tube.

20. In a carbureter, the combination with a mixing chamber having an air inlet, of a pump, a connection between the pump and the mixing chamber, an automatic valve controlling the outlet of the pump, and provision for admitting air to the connection beyond the valve.

21. In a carbureter, the combination with a mixing chamber having a valve controlled air inlet, of a nozzle discharging into the mixing chamber, a reciprocating pump, a vertical tube having provision for admitting air thereto and connected with the outlet of the pump and with which the nozzle is in communication, and a weighted valve in the tube controlling the outlet of the pump.

In testimony whereof I affix my signature in presence of two witnesses.

JOHN F. McCANNA.

Witnesses:
ARTHUR B. SEIBOLD,
ELIZABETH MOLITOR.